(12) United States Patent
Tamura et al.

(10) Patent No.: US 10,811,683 B2
(45) Date of Patent: Oct. 20, 2020

(54) POSITIVE ELECTRODE FOR LITHIUM ION SECONDARY BATTERY, AND LITHIUM ION SECONDARY BATTERY

(71) Applicant: Envision AESC Japan Ltd., Kanagawa (JP)

(72) Inventors: Hidetoshi Tamura, Kanagawa (JP); Yuji Tanjo, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 0 days.

(21) Appl. No.: 16/104,569

(22) Filed: Aug. 17, 2018

(65) Prior Publication Data
US 2019/0067691 A1    Feb. 28, 2019

(30) Foreign Application Priority Data

Aug. 28, 2017 (JP) .................................. 2017-163015

(51) Int. Cl.
*H01M 4/505* (2010.01)
*H01M 10/0525* (2010.01)
(Continued)

(52) U.S. Cl.
CPC ........... *H01M 4/505* (2013.01); *H01M 4/131* (2013.01); *H01M 4/364* (2013.01); *H01M 4/485* (2013.01);
(Continued)

(58) Field of Classification Search
CPC ...... H01M 4/131; H01M 4/134; H01M 4/364; H01M 4/485; H01M 4/505; H01M 4/525;
(Continued)

(56) References Cited

U.S. PATENT DOCUMENTS

2016/0181606 A1    6/2016    Suga et al.
2016/0190549 A1    6/2016    Ohara et al.
(Continued)

FOREIGN PATENT DOCUMENTS

EP          3086390 A1    10/2016
JP      2013-065467 A     4/2013
(Continued)

OTHER PUBLICATIONS

WO2014142281 (Year: 2014).*
Extended European Search Report issued in corresponding European Patent Application No. 18189775.2 dated Oct. 30, 2018.

*Primary Examiner* — Alexander Usyatinsky
(74) *Attorney, Agent, or Firm* — Morgan, Lewis & Bockius LLP (57) ABSTRACT

Provided is a positive electrode for a lithium ion secondary battery which includes a positive electrode active material layer including a positive electrode active material that is provided to at least one surface of a positive electrode current collector. The positive electrode active material includes a lithium nickel cobalt manganese composite oxide mixture containing two or more kinds of lithium nickel cobalt manganese composite oxides. An average primary particle diameter of the lithium nickel cobalt manganese composite oxide mixture is in a range of 0.4 micrometers or more and 2 micrometers or less. An average secondary particle diameter of the lithium nickel cobalt manganese composite oxide mixture is in a range of 4 micrometers or more and 12 micrometers or less. The positive electrode active material layer includes a conductive agent in a range of 1 to 5% based on a weight of the positive electrode active material layer.

6 Claims, 1 Drawing Sheet

(51) Int. Cl.
*H01M 4/525* (2010.01)
*H01M 4/36* (2006.01)
*H01M 4/131* (2010.01)
*H01M 4/485* (2010.01)
H01M 4/02 (2006.01)

(52) U.S. Cl.
CPC ....... *H01M 4/525* (2013.01); *H01M 10/0525* (2013.01); *H01M 2004/021* (2013.01); *H01M 2004/028* (2013.01)

(58) Field of Classification Search
CPC ............. H01M 4/667; H01M 10/0525; H01M 2004/021; H01M 2004/028; H01M 4/36
See application file for complete search history.

(56) References Cited

U.S. PATENT DOCUMENTS

2016/0315312 A1* 10/2016 Tamura ............... H01M 2/0275
2017/0309948 A1* 10/2017 Azami ..................... H01M 4/13
2018/0076479 A1* 3/2018 Kawasaki ........... H01M 10/058

FOREIGN PATENT DOCUMENTS

| WO | 2014/142281 A1 | 9/2014 |
| WO | WO2014142281 | * 9/2014 |
| WO | WO 2016063813 | * 4/2016 |
| WO | 2016/152876 A1 | 9/2016 |

* cited by examiner

POSITIVE ELECTRODE FOR LITHIUM ION SECONDARY BATTERY, AND LITHIUM ION SECONDARY BATTERY

CROSS-REFERENCE TO RELATED APPLICATION

This application claims priority from Japanese Patent Application No. 2017-163015 filed with the Japan Patent Office on Aug. 28, 2017, the entire contents of which are hereby incorporated by reference.

BACKGROUND

1. Technical Field

The present disclosure relates to a positive electrode for a lithium ion secondary battery, and a lithium ion secondary battery.

2. Related Art

Nonaqueous electrolyte batteries have been put into practical use as batteries for automobiles including hybrid automobiles, electric automobiles, and the like. One example of such batteries for on-vehicle power sources is a lithium ion secondary battery. The lithium ion secondary battery is required to have various characteristics including an output characteristic, energy density, capacity, lifetime, high-temperature stability, and the like.

In particular, a material capable of stably intercalating and deintercalating lithium ions as a positive electrode material to serve as a lithium ion source has always been demanded. In order to secure a discharging characteristic, capacity, and stability of the battery, development of the positive electrode material in which these performances are well balanced has been expected.

According to a suggestion in JP-A-2013-65467 that is made in order to obtain a positive electrode for a lithium ion secondary battery having the high density, and the excellent rate characteristic and cycle characteristics, a first active material and a second active material having the same composition and having different average particle diameters and porosities are mixed and used. The positive electrode according to JP-A-2013-65467 has the excellent rate characteristic and cycle characteristics regardless of having the high active material density. Therefore, it is disclosed that the lithium ion secondary battery with the high energy density can be obtained.

SUMMARY

A positive electrode for a lithium ion secondary battery according to the present disclosure includes a positive electrode active material layer including a positive electrode active material that is provided to at least one surface of a positive electrode current collector. The positive electrode active material includes a lithium nickel cobalt manganese composite oxide mixture containing two or more kinds of lithium nickel cobalt manganese composite oxides. An average primary particle diameter of the lithium nickel cobalt manganese composite oxide mixture is in a range of 0.4 micrometers or more and 2 micrometers or less. An average secondary particle diameter of the lithium nickel cobalt manganese composite oxide mixture is in a range of 4 micrometers or more and 12 micrometers or less. The positive electrode active material layer includes a conductive agent in a range of 1 to 5% based on a weight of the positive electrode active material layer.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It has been known that the volume of a positive electrode for a lithium ion secondary battery changes as lithium ions are intercalated and deintercalated in charging and discharging the battery. In view of this, JP-A-2013-65467 has suggested to use two kinds of active materials with different particle diameters and porosities in order to relieve the stress that is generated in the charging and discharging. Thus, the crack of a positive electrode active material layer can be prevented. However, the active material used in the positive electrode according to JP-A-2013-65467 has a relative large secondary particle diameter. Therefore, the volume change amount when the lithium ions are intercalated and deintercalated is also large. As a result, the separation from a positive electrode current collector may occur, for example.

In view of the above, an object of the present disclosure is to provide a positive electrode for a lithium ion battery that can achieve a lithium ion secondary battery with the capacity and the cycle characteristics secured, by reducing the amount of deformation of the positive electrode active material layer that can occur in charging and discharging the battery.

A positive electrode for a lithium ion secondary battery according to an embodiment of the present disclosure includes a positive electrode active material layer including a positive electrode active material that is provided to at least one surface of a positive electrode current collector. The positive electrode active material includes a lithium nickel cobalt manganese composite oxide mixture containing two or more kinds of lithium nickel cobalt manganese composite oxides. An average primary particle diameter of the lithium nickel cobalt manganese composite oxide mixture is in a range of 0.4 micrometers or more and 2 micrometers or less. An average secondary particle diameter of the lithium nickel cobalt manganese composite oxide mixture is in a range of 4 micrometers or more and 12 micrometers or less. The positive electrode active material layer includes a conductive agent in a range of 1 to 5% based on a weight of the positive electrode active material layer.

Further, a positive electrode for a lithium ion secondary battery according to another embodiment of the present disclosure includes a positive electrode active material layer including a positive electrode active material that is provided to at least one surface of a positive electrode current collector. The positive electrode active material includes a lithium nickel cobalt manganese composite oxide mixture containing three or more kinds of lithium nickel cobalt manganese composite oxides. An average primary particle diameter of the lithium nickel cobalt manganese composite oxide mixture is in a range of 0.2 micrometers or more and 2.5 micrometers or less. An average secondary particle diameter of the lithium nickel cobalt manganese composite oxide mixture is in a range of 3 micrometers or more and 12 micrometers or less. The positive electrode active material layer includes a conductive agent in a range of 1 to 5% based on a weight of the positive electrode active material layer.

Further, still another embodiment of the present disclosure relates to a lithium ion secondary battery which includes a power generating element and a package according to the above-mentioned embodiments. The package includes the power generating element internally, and the power generating element includes the positive electrode for a lithium ion secondary battery according to any one of claims 1 to 4, a negative electrode for a lithium ion secondary battery including a negative electrode active material layer including a negative electrode active material that is provided to at least one surface of a negative electrode current collector, a separator, and an electrolyte solution.

The positive electrode for a lithium ion secondary battery according to the present disclosure does not easily expand and contract due to the charging and discharging. Therefore, the battery has a long lifetime. In addition, the positive electrode for a lithium ion secondary battery according to the present disclosure has the high capacity and the excellent discharging characteristic. Therefore, the lithium ion secondary battery with high performance can be provided.

An embodiment of the present disclosure will hereinafter be described. A lithium ion secondary battery includes a power generating element inside a package. The power generating element includes a positive electrode, a negative electrode, a separator, and an electrolyte solution. Here, the positive electrode refers to a battery member with a thin plate shape or a sheet shape including a positive electrode active material layer. The positive electrode active material layer is formed by applying or rolling, and drying a mixture of a positive electrode active material, binder, and if necessary, a conductive agent on a positive electrode current collector such as a metal foil. The negative electrode is a battery member with a thin plate shape or a sheet shape including a negative electrode active material layer. The negative electrode active material layer is formed by applying a mixture of a negative electrode active material, binder, and if necessary, a conductive agent on a negative electrode current collector. The separator is a film-shaped battery member to secure lithium ion conductivity between the negative electrode and the positive electrode by separating the positive electrode and the negative electrode from each other. The electrolyte solution is a solution with electric conductivity including an ionic substance that is dissolved in a solvent. In the present embodiment, in particular, a non-aqueous electrolyte solution can be used. The power generating element including the positive electrode, the negative electrode, the separator, and the electrolyte solution is one unit of main components of the battery. In general, a stack of the positive electrode and the negative electrode that are overlapped (stacked) on each other with the separator interposed therebetween as the power generating element is immersed in the electrolyte solution.

The lithium ion secondary battery is formed to include the power generating element inside the package. Preferably, the power generating element is housed inside the package that is sealed. The sealing means that the power generating element is covered with a packaging material to be described below so that the power generating element is not exposed to external air. The package is a housing that can seal the power generating element internally, or has a bag-like shape formed of a flexible material. The positive electrode for a lithium ion secondary battery according to the present disclosure is applicable to various types of lithium ion secondary batteries such as a coin type battery, a laminate type battery, and a wound type battery.

The positive electrode for a lithium ion secondary battery according to the present embodiment is a battery member with a thin plate shape or a sheet shape including the positive electrode active material layer formed by applying or rolling, and drying the mixture of the positive electrode active material, the binder, and the conductive agent on the positive electrode current collector such as a metal foil. Preferably, the positive electrode includes the positive electrode active material layer obtained by applying or rolling, and drying the mixture of the positive electrode active material, the binder, and the conductive agent on the positive electrode current collector including the metal foil such as an aluminum foil. The positive electrode active material includes a lithium nickel cobalt manganese composite oxide mixture containing two or more kinds of lithium nickel cobalt manganese composite oxides. Here, the lithium nickel cobalt manganese composite oxide is one of lithium nickel composite oxides. The lithium nickel composite oxide is a transition metal composite oxide containing at least lithium and nickel, and is represented by a general formula: $Li_xNi_yMe_{(1-y)}O_2$ (here, Me represents at least one or more selected from the group consisting of Al, Mn, Na, Fe, Co, Cr, Cu, Zn, Ca, K, Mg, and Pb, x satisfies $1.0 \leq x \leq 1.2$, and y is a positive numeral of less than 1.0). The lithium nickel cobalt manganese composite oxide as the lithium nickel composite oxide containing cobalt (Co) and manganese (Mn) as Me in the above formula can be used as the composition of the positive electrode active material.

The lithium nickel cobalt manganese composite oxide used in the embodiment is a compound that is represented by a general formula $Li_xNi_yCo_zMn_{(1.0-y-z)}O_2$, and has a layered crystal structure. Here, x in the general formula satisfies $1.0 \leq x \leq 1.2$, and y and z are positive numerals satisfying $y+z<1.0$. The lithium nickel composite oxide represented by this general formula is the lithium nickel cobalt manganese composite oxide (hereinafter also referred to as "NCM"). NCM is the lithium nickel composite oxide that is suitably used in order to increase the capacity of the battery. For example, when x=1, y=0.4, and z=0.3 in the general formula $Li_xNi_yCo_zMn_{(1.0-y-z)}O_2$, this composite oxide is referred to as "NCM433". In addition, when x=1, y=0.5, and z=0.2, this composite oxide is referred to as "NCM523".

In the embodiment, preferably, the lithium nickel cobalt manganese composite oxide mixture containing two or more kinds of lithium nickel cobalt manganese composite oxides is used as the positive electrode active material. Here, the term "two or more kinds of lithium nickel cobalt manganese composite oxides" refers to a plurality of lithium nickel cobalt manganese composite oxides with different compositions. That is to say, in the present embodiment, two or more kinds of lithium nickel cobalt manganese composite oxides represented by the general formula $Li_xNi_yCo_zMn_{(1.0-y-z)}O_2$ with different numerals in x, y, or z are mixed and used. In the example of the above general formula, the lithium nickel cobalt manganese composite oxide mixture containing "NCM433" in which x=1, y=0.4, and z=0.3, and "NCM523" in which x=1, y=0.5, and z=0.2 can be used as the positive electrode active material. As lithium is intercalated and deintercalated, the lithium nickel cobalt manganese composite oxide deforms, and the amount of deformation is different depending on the composition. In view of this, by mixing two or more kinds of lithium nickel cobalt manganese composite oxides, the deformation of the positive electrode active material layer can be adjusted.

Here, preferably, an average primary particle diameter ($d_{50}$) of the lithium nickel cobalt manganese composite oxide mixture as the positive electrode active material is in the range of 0.4 micrometers or more and 2 micrometers or less. More preferably, an average secondary particle diameter ($D_{50}$) of the lithium nickel cobalt manganese composite oxide mixture is in the range of 4 micrometers or more and 12 micrometers or less. The lithium nickel cobalt manganese composite oxide includes primary particles, which are the minimum unit, and spherical secondary particles that are formed by a layered aggregation of the primary particles.

The positive electrode active material may be the lithium nickel cobalt manganese composite oxide containing three or more kinds of lithium nickel cobalt manganese composite oxides. In this case, preferably, the average primary particle diameter ($d_{50}$) of the lithium nickel cobalt manganese composite oxide mixture is in the range of 0.2 micrometers or more and 2.5 micrometers or less. In addition, preferably, the average secondary particle diameter ($D_{50}$) of the lithium nickel cobalt manganese composite oxide mixture is in the range of 3 micrometers or more and 12 micrometers or less. When three or more kinds of lithium nickel cobalt manganese composite oxides with different compositions are mixed, a lithium nickel cobalt manganese composite oxide other than the mixed lithium nickel cobalt manganese composite oxides may be generated in a manner similar to the case in which two or more kinds of lithium nickel cobalt manganese composite oxides are mixed. These oxides are aggregated in an approximately spherical form, and thus lithium nickel cobalt manganese composite oxide secondary particles with complicated composition and structure are formed. If the lithium nickel cobalt manganese composite oxide deforms in charging and discharging the battery and the crack or the like occurs, a part of the battery may fail to contribute to the charging and discharging. However, when the average particle diameter of the primary particle that is the minimum unit of the lithium nickel cobalt manganese composite oxide and the average particle diameter of the secondary particles that are aggregated in the approximately spherical form are in a predetermined range, the part that fails to contribute to the charging and discharging can be reduced. In addition, by setting the primary particle diameters and the secondary particle diameters to be well balanced, the secondary particles are disposed in the positive electrode active material layer relatively uniformly. The large secondary particles deform relatively largely as the lithium ions are intercalated and deintercalated. Therefore, if the secondary particles are disposed non-uniformly in the positive electrode active material layer, the deformation occurs locally in a part where the secondary particles are disposed. However, in the positive electrode active material layer in the present embodiment, the secondary particles are disposed uniformly. Therefore, the above problem does not occur easily.

The positive electrode active material layer may further include a conductive agent. Examples of the conductive agent include carbon fiber such as carbon nanofiber, carbon black such as acetylene black and Ketjen black, and other carbon materials such as activated carbon, graphite, mesoporous carbon, fullerenes, and carbon nanotube. In addition, the positive electrode active material layer may contain an electrode additive generally used for forming the electrode, such as thickener, dispersant, and stabilizer. The conductive agent is contained preferably in the range of 1 to 5% based on the weight of the positive electrode active material layer. Even if the positive electrode active material layer expands or contracts and deforms, containing the conductive agent in the positive electrode active material layer by 1 to 5% by weight can secure a conductive path in the positive electrode active material layer.

The positive electrode active material layer may further include binder. The binder plays a role of binding between particles of the lithium nickel cobalt manganese composite oxide as the positive electrode active material, and between the positive electrode active material layer and the metal foil. Examples of the binder that can be used include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin. The binder is particularly preferably a viscoelastic body that can prevent the deformation of the positive electrode active material layer. Therefore, the binder that is suitably used in the embodiment is synthetic rubber such as SBR, BR, CR, IR, and NBR, or polysaccharide such as CMC. The binder is preferably contained by 1 to 5% by weight based on the weight of the positive electrode active material layer. When the binder is contained by 1 to 5% by weight, the deformation of the positive electrode active material is relieved and the durability of the positive electrode active material layer is improved. In addition, the positive electrode active material layer may contain the electrode additive generally used for forming the electrode, such as thickener, dispersant, and stabilizer.

In the embodiment, the positive electrode active material layer can be formed in a manner that: a slurry prepared by mixing the positive electrode active material, the conductive agent, and the binder in a solvent (such as N-methylpyrrolidone (NMP) or water) in an appropriate proportion is applied or rolled on the positive electrode current collector (such as aluminum foil), and then the slurry is heated so that the solvent is evaporated.

The negative electrode that is used together with the positive electrode for a lithium ion secondary battery according to the embodiment and is included in the lithium ion secondary battery corresponds to a battery member with a thin plate shape or a sheet shape including the negative electrode active material layer. The negative electrode active material layer is formed by applying or rolling, and drying a mixture of the negative electrode active material, the binder, and if necessary, the conductive agent on the negative electrode current collector such as a metal foil.

In the case of using the negative electrode formed by applying or rolling, and drying the mixture of the negative electrode active material, the binder, and if necessary the conductive agent on the negative electrode current collector, a carbon material is preferably used as the negative electrode active material. Here, the carbon material includes graphite. In particular, when graphite is contained in the negative electrode active material layer, the output of the battery can be improved even if the state of charge (SOC) of the battery is low, and this is advantageous. Graphite is a hexagonal crystal carbon material having a hexagonal-plate-like crystal structure, and is also referred to as black lead. The shape of the graphite is preferably like a particle.

As the graphite, there are natural graphite and artificial graphite. The natural graphite is inexpensive and can be obtained in large quantity, and moreover has a stable structure and excellent durability. The artificial graphite is the artificially produced graphite and has high purity. That is to say, the artificial graphite hardly contains impurities such as allotropes. Therefore, the electric resistance is low. The natural graphite and the artificial graphite can be given as examples of the carbon material that can be suitably used in the present embodiment.

An interlayer distance d value (d002) of the artificial graphite used in the present embodiment is preferably 0.337 nm or more. The artificial graphite usually has a crystal structure that is thinner than that of the natural graphite. The artificial graphite that satisfies the condition of having the interlayer distance at which the intercalation of lithium ions is possible can be used as the negative electrode active material for a lithium ion secondary battery. The interlayer distance at which the intercalation of lithium ions is possible can be estimated based on the d value (d002). If the d value is 0.337 nm or more, intercalation and deintercalation of lithium ions are possible without a problem.

As the carbon material, amorphous carbon can also be used. Amorphous carbon is a carbon material which has a network structure including microcrystals that are connected randomly and is amorphous as a whole. Amorphous carbon may partially have a structure that is similar to graphite. Examples of the amorphous carbon include carbon black, coke, activated carbon, carbon fiber, hard carbon, soft carbon, and mesoporous carbon. The natural graphite particle covered with amorphous carbon or the artificial graphite particle covered with amorphous carbon can be used as the carbon material of the negative electrode active material. When the natural graphite covered with amorphous carbon or the artificial graphite covered with amorphous carbon is used, the decomposition of the electrolyte solution is suppressed and the negative electrode can have the higher durability.

The binder in the negative electrode active material layer plays a role of binding between particles of the carbon material as the negative electrode active material, and between the negative electrode active material layer and the metal foil. If PVDF is used as the binder, N-methylpyrrolidone (NMP) can be used as the solvent instead of water. Therefore, the gas generation due to the remaining moisture can be prevented. In particular, preferably, the binder is contained in the range of 4 to 7% by weight based on the weight of the entire negative electrode active material layer. When the binder is contained in this range, the binding force of the negative electrode material can be secured and the resistance of the negative electrode can be maintained to be low. Examples of the binder that can be used include: fluorine resins such as PVDF, polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

The negative electrode active material layer may contain the conductive agent if necessary. Examples of the conductive agent include carbon fiber such as carbon nanofiber, carbon black such as acetylene black and Ketjen black, and other carbon materials such as activated carbon, mesoporous carbon, fullerenes, and carbon nanotube. In addition, the negative electrode active material layer may contain the electrode additive generally used for forming the electrode, such as thickener, dispersant, and stabilizer.

The negative electrode active material layer can be formed in a manner that: a slurry prepared by mixing the carbon material as the negative electrode active material, the binder, and the conductive agent in the solvent (such as N-methylpyrrolidone (NMP) or water) in an appropriate proportion is applied or rolled on the negative electrode current collector including the metal foil (such as copper foil), and then the slurry is heated so that the solvent is evaporated.

The metal foil alone that is used as the negative electrode is preferably a lithium foil.

The separator that is used together with the positive electrode for a lithium ion secondary battery according to the embodiment and is included in a lithium ion secondary battery is a film-shaped battery member that separates between the positive electrode and the negative electrode and secures the conductivity of lithium ions between the negative electrode and the positive electrode. The separator includes an olefin resin layer. The olefin resin layer is a layer formed of polyolefin obtained by polymerizing or co-polymerizing α-olefin such as ethylene, propylene, butene, pentene, or hexene. The separator used in the present embodiment preferably has a structure including pores that are closed when the temperature of the battery increases. That is to say, this separator preferably includes a layer formed of porous polyolefin or microporous polyolefin. When the olefin resin layer has such a structure, even if the battery temperature should increase, the separator is closed (shutdown) to block the ion flow. To achieve the shutdown effect, it is particularly preferable to use a porous polyethylene film. The separator may have a heat-resistant microparticle layer. In this case, the heat-resistant microparticle layer provided to prevent abnormal heat generation of the battery includes inorganic microparticles that can resist temperatures of 150° C. or more and are stable against an electrochemical reaction. Examples of such inorganic microparticles include inorganic oxide such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite. The ceramic separator including the heat-resistant layer can also be used.

The electrolyte solution that is used together with the positive electrode for a lithium ion secondary battery according to the embodiment and is included in a lithium ion secondary battery is a solution with the electric conductivity that includes an ionic substance dissolved in the solvent. In the embodiment, in particular, a nonaqueous electrolyte solution can be used. The power generating element including the positive electrode, the negative electrode, the separator, and the electrolyte solution constitutes one unit of the main components of the battery. The stack including the positive electrode and the negative electrode that are stacked with the separator interposed therebetween as the power generating element is immersed in the electrolyte solution.

The electrolyte solution is a nonaqueous electrolyte solution. A preferable example of the electrolyte solution is a mixture of a linear carbonate and a cyclic carbonate. Examples of the linear carbonate include dimethyl carbonate (hereinafter referred to as "DMC"), diethyl carbonate (hereinafter referred to as "DEC"), ethylmethyl carbonate (hereinafter referred to as "EMC"), di-n-propyl carbonate, di-t-propyl carbonate, di-n-butyl carbonate, di-isobutyl carbonate, and di-t-butyl carbonate. Examples of the cyclic carbonate include propylene carbonate (PC) and ethylene carbonate (hereinafter referred to as "EC"). The electrolyte solution is prepared by dissolving a lithium salt such as lithium hexafluorophosphate (LiPF$_6$), lithium tetrafluoroborate (LiBF$_4$), or lithium perchlorate (LiClO$_4$) in such a carbonate mixture.

The electrolyte solution preferably contains PC and/or EC corresponding to the cyclic carbonate and DMC and/or EMC corresponding to the linear carbonate in an appropriate combination. PC is the solvent with a low coagulating point, and is therefore used to improve the output when the battery has low temperature. However, it is known that the compatibility of PC to the graphite used as the negative electrode is a little low. EC is the solvent with a high dielectric constant. EC is therefore used as the component of the electrolyte solution for a lithium ion secondary battery. However, EC has a high melting point (coagulating point) and is solid at room temperature. Therefore, even if EC is used as the component of the mixing solvent, the coagulation and the deposition of EC may occur at low temperature. DMC is the solvent with low viscosity and a high diffusion coefficient. However, DMC has a high melting point (coagulating point). Therefore, it may happen that the electrolyte solution is coagulated at low temperature. Like DMC, EMC is also the solvent with the low viscosity and the high diffusion coefficient. In this manner, the components of the electrolyte solution have the different characteristics. For example, in order to improve the output when the battery has the low temperature, it is important to consider the balance between these components. By adjusting the ratio between the cyclic carbonate and the linear carbonate to be contained, the electrolyte solution having the low viscosity at room temperature and maintaining its property even at the low temperature can be obtained.

The electrolyte solution may contain the cyclic carbonate compound as the additive. Examples of the cyclic carbonate used as the additive include vinylene carbonate (hereinafter referred to as "VC"). A cyclic carbonate compound with a halogen may be used as the additive. These cyclic carbonates are also the compounds that form a protective film for the positive electrode and the negative electrode in the process of charging and discharging the battery. In particular, the cyclic carbonates can prevent a sulfur-containing compound such as a disulfonic acid compound or a disulfonic acid ester compound from attacking the positive electrode active material containing the lithium nickel composite oxide. Examples of the cyclic carbonate compounds with a halogen include fluoroethylene carbonate (hereinafter referred to as "FEC"), difluoroethylene carbonate, trifluoroethylene carbonate, chloroethylene carbonate, dichloroethylene carbonate, and trichloroethylene carbonate. Fluoroethylene carbonate corresponding to the cyclic carbonate compound with a halogen is particularly preferably used.

The electrolyte solution may further contain a disulfonic acid compound as the additive. The disulfonic acid compound is a compound having two sulfo groups in one molecule. The disulfonic acid compound incorporates a disulfonate compound corresponding to a salt formed by the reaction between the sulfo group and the metal ion, and a disulfonic acid ester compound having an ester bond including the sulfo group. One or two of the sulfo groups of the disulfonic acid compound may form the salt with the metal ion or may be in the anion state. Examples of the disulfonic acid compound include methanedisulfonic acid, 1,2-ethanedisulfonic acid, 1,3-propanedisulfonic acid, 1,4-butanedisulfonic acid, benzenedisulfonic acid, naphthalenedisulfonic acid, biphenyldisulfonic acid, salts thereof (such as lithium methanedisulfonate and lithium 1,3-ethanedisulfonate), and anions thereof (such as methanedisulfonic acid anion and 1,3-ethanedisulfonic acid anion). Other examples of the disulfonic acid compound include a disulfonic acid ester compound. Linear disulfonic acid esters of alkyl diester and aryl diester, such as methanedisulfonic acid, 1, 2-ethanedisulfonic acid, 1, 3-propanedisulfonic acid, 1, 4-butanedisulfonic acid, benzenedisulfonic acid, naphthalenedisulfonic acid, and biphenyldisulfonic acid are preferably used. Additionally, cyclic disulfonic acid esters such as methylene methanedisulfonate, ethylene methanedisulfonate, and propylene methanedisulfonate are preferably used. Methylene methanedisulfonate (hereinafter referred to as "MMDS") is particularly preferable.

The package that is used together with the positive electrode for a lithium ion secondary battery according to the embodiment and is included in a lithium ion secondary battery may be a housing formed of a metal material. Alternatively, the package may be a bag-shaped package formed of a stack in which a coating layer such as a nylon layer or a polyethylene terephthalate layer, a metal base material, an acid modified polypropylene layer, and a polypropylene layer are stacked. Here, the metal material used as the material of the package may be, for example, aluminum, nickel, iron, copper, stainless steel, or tin. The metal base material of the stack is a base material suitably used as a packaging film of the battery, and is preferably a metal foil. Examples of the metal foil include a foil of aluminum, nickel, iron, copper, stainless steel, or tin. The package has a function of sealing a nonaqueous electrolyte solution inside the package. Inside the package corresponding to the housing made of metal, the power generating element including the positive electrode, the negative electrode, the separator, and the electrolyte solution can be sealed. Alternatively, three sides of the stack except the side where the stack is folded are heat sealed, or the two stacks are overlapped on each other and the four sides are heat sealed. Thus, the power generating element including the positive electrode, the negative electrode, the separator, and the electrolyte solution can be housed inside the sealed package.

Figure 1:
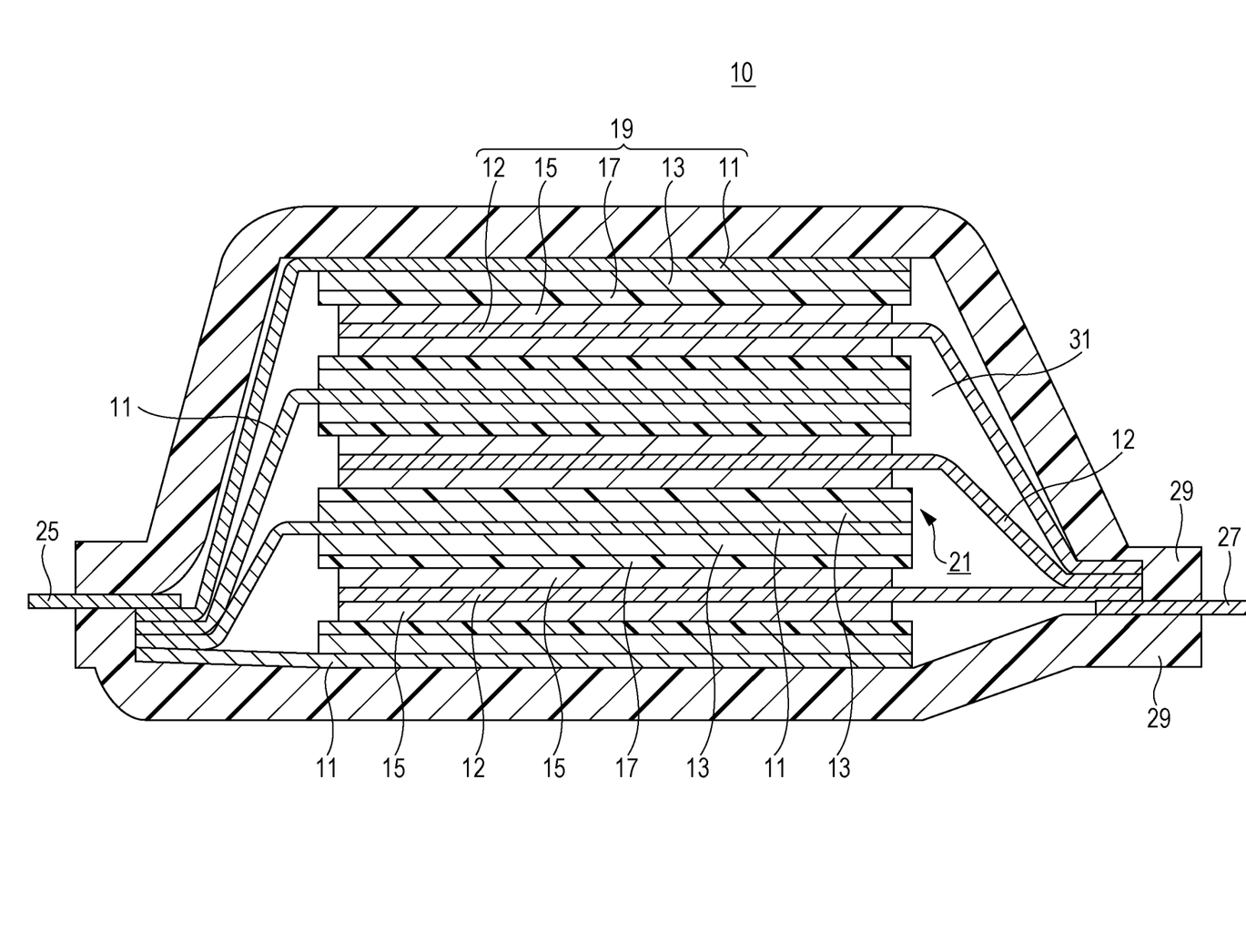
FIG. 1 is a schematic cross-sectional view illustrating a lithium ion secondary battery including a positive electrode for a lithium ion secondary battery according to an embodiment of the present disclosure.

Here, a structure example of the lithium ion secondary battery manufactured using the positive electrode active material according to the embodiment is described with reference to FIG. 1. FIG. 1 illustrates one example of a cross-sectional view of the lithium ion secondary battery. A lithium ion secondary battery 10 mainly includes a negative electrode current collector 11, a negative electrode active material layer 13, a separator 17, a positive electrode current collector 12, and a positive electrode active material layer 15. In FIG. 1, the negative electrode active material layer 13 is provided at each surface of the negative electrode current collector 11. In addition, at each surface of the positive electrode current collector 12, the positive electrode active material layer 15 is provided. However, the active material layer may be formed at only one surface of each current collector. The negative electrode current collector 11, the positive electrode current collector 12, the negative electrode active material layer 13, the positive electrode active material layer 15, and the separator 17 constitute one unit cell, that is, a power generating element (in FIG. 1, unit cell 19). The separator 17 may include the heat-resistant microparticle layer and the olefin resin film (neither are shown). A plurality of such unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. These leads may be partly coated with another metal (such as nickel, tin, or solder) or a polymer material. The positive electrode lead and the negative electrode lead are welded to the positive electrode and the negative electrode, respectively. The battery including the unit cells manufactured as above is covered with a package 29 so that the welded negative electrode lead 25 and positive electrode lead 27 are led out of the battery. In FIG. 1, a stack (laminate) is used as the package 29. An electrolyte solution 31 is poured into the package 29. The package 29 has a shape obtained by heat sealing the periphery of the two stacks that are overlapped. In FIG. 1, the negative electrode lead 25 and the positive electrode lead 27 are provided to opposite sides of the package 29 (referred to as "both-tab type"). Alternatively, the negative electrode lead 25 and the positive electrode lead 27 may be provided to one side of the package 29 (that is, the negative electrode lead 25 and the positive electrode lead 27 are provided to the outside from one side of the package 29, which is referred to as "one-tab type").

The lithium ion secondary battery including the positive electrode for a lithium ion secondary battery according to the present embodiment has the high capacity and the excellent discharging characteristic. The expansion or contraction phenomenon of the positive electrode when the battery is charged and discharged is suppressed; therefore, the positive electrode has a long lifetime. Therefore, the battery itself also has a long lifetime. Such a lithium ion secondary battery is suitably used as an on-vehicle battery or a stationary battery in particular.

Example

<Manufacture of Positive Electrode>

As the positive electrode active material, the lithium nickel cobalt manganese composite oxide (NCM) was used. The prepared positive electrode active materials were the following four kinds: NCM622, NCM523, NCM433, and NCM [4.5]2[3.5]. One kind, two kinds, or three kinds of these positive electrode active materials were mixed as expressed in Table 1 and used. The primary particle average particle diameter ($d_{50}$) and the secondary particle average particle diameter ($D_{50}$) of the lithium nickel cobalt manganese composite oxide or the lithium nickel cobalt manganese composite oxide mixture were obtained. The primary particle average particle diameter was obtained by measuring the primary particle diameter on the cross section of the electrode with ImageJ image analysis software from an observation image obtained by scanning ion microscope (SIM). The secondary particle average particle diameter ($D_{50}$) was measured using a laser diffraction particle size distribution measurement device. Carbon black (CB) (SC65, manufactured by TIMCAL) with a BET specific surface area of 62 $m^2$/g and graphite (GR) (KS6L, manufactured by TIMCAL) that correspond to the conductive agent, and PVDF (#7200, Kureha Battery Materials Japan Co., Ltd.) that corresponds to the binder resin were mixed so that the solid content mass ratio as expressed in Table 1 was satisfied. The obtained mixture was added to NMP as the solvent. To this mixture, oxalic acid anhydrous (molecular weight: 90) as the organic moisture scavenger was added. The amount of added oxalic anhydride was 0.03 parts by mass relative to 100 parts by mass of the solid content of the mixture excluding NMP. Next, these materials were dispersed uniformly by performing dispersed mixing for 30 minutes by a planetary method. Thus, the slurry was prepared. The obtained slurry was applied on a 20-μm-thick aluminum foil serving as the positive electrode current collector so that the weight of the slurry after the drying became 21.4±0.3 mg/$cm^2$ on each surface. Next, the electrode was heated at 125° C. for 10 minutes to evaporate NMP; thus, the positive electrode active material layer was formed. In addition, by pressing the positive electrode at 3.5 N/$cm^2$, the positive electrode including the positive electrode active material layer applied on one surface of the positive electrode current collector was manufactured.

<Manufacture of Negative Electrode>

As the negative electrode active material, natural graphite powder was used. This carbon material powder, styrene butadiene rubber (SBR) and carboxymethyl cellulose (CMC) as the binder resin, and the carbon black powder (CB) as the conductive agent were mixed uniformly in a solid content mass ratio of graphite powder:SBR:CMC:CB=91:2:2:5. The resulting mixture was added to pure water as the solvent; thus, slurry was prepared. The obtained slurry was applied on both surfaces of a 10-μm-thick rectangular copper foil serving as the negative electrode current collector by a doctor's blade method so that the dried slurry had a weight of 11 mg±0.2/$cm^2$ on each surface. Next, drying was performed at 100° C. Then, the obtained electrode was rolled and pressed, and thus, the negative electrode active material layer was provided.

<Separator>

A 25-μm-thick separator (Celgard 2500) including polypropylene was used.

<Electrolyte Solution>

Ethylene carbonate (EC), propylene carbonate (PC), and diethyl carbonate (DEC) were mixed at a ratio of 25:5:70 (volume ratio); thus, a mixed nonaqueous solvent was obtained. To the obtained mixed nonaqueous solvent, lithium hexafluorophosphate ($LiPF_6$) as the electrolyte salt was dissolved so that the concentration thereof became 0.9 mol/L. Next, MMDS as the additive was dissolved by 1.2% by weight. The obtained nonaqueous mixed solvent was used as the electrolyte solution.

<Package>

A stacked film containing a stack of nylon with a thickness of 25 μm, soft aluminum with a thickness of 40 μm, and polypropylene with a thickness of 40 μm was used as a laminate film for the package.

<Manufacture of Lithium Ion Secondary Battery>

The positive electrode and the negative electrode manufactured as above were cut into rectangular shapes with a predetermined size. On a part where coating was not applied for connecting a positive electrode terminal, a positive electrode lead terminal made of aluminum was welded with ultrasonic waves. Similarly, on a part where coating was not applied for connecting a negative electrode terminal, a negative electrode lead terminal made of nickel was welded with ultrasonic waves. The negative electrode plate and the positive electrode plate were disposed on both surfaces of a polypropylene porous separator in a state that both active material layers are overlapped on each other through the separator; thus, an electrode stack was obtained. This electrode stack was covered with two packages, and except one long side of the packages, the other three sides were attached through heat sealing. The electrolyte solution was poured so that the liquid amount became 140% relative to the pores of the separator and the electrode stack. Next, the pores of the separator and the electrode stack were immersed in the electrolyte solution in vacuum. After that, the opening was heat sealed under reduced pressure, so that the package was sealed. Thus, the stacked type lithium ion battery was fabricated. After the initial charging of this stacked type lithium ion battery, aging was performed at 45° C. for several days; thus, the stacked type lithium ion secondary battery was obtained.

<Initial Charging-Discharging>

The initial charging-discharging was performed using the stacked type lithium ion secondary battery fabricated as above. In the initial charging-discharging, first, constant-current and constant-voltage (CC-CV) charging was performed at an atmospheric temperature of 25° C. with a current of 10 mA and an upper-limit voltage of 4.2 V. After that, aging was performed at 45° C. for several days. Next, constant-current discharging was performed with a current of 20 mA to 2.5 V.

<Cycle Characteristic Test>

A cycle characteristic test was performed on the stacked type lithium ion secondary battery after the above initial charging-discharging was performed. In this cycle characteristic test, one constant-current constant-voltage charging and the subsequent one constant-current discharging that are carried out in a 25° C. environment constitute one cycle, and this cycle was repeated 500 times. The charging condition was: 100 mA, upper-limit voltage 4.15 V, and end current 1 mA. The discharging condition was: 100 mA and final lower-limit voltage 2.5 V. Using the discharging capacity in the first cycle and the discharging capacity in the 500-th cycle obtained from the measurement, the retention (%) of the discharging capacity in the 500-th cycle relative to the discharging capacity in the first cycle (=the discharging capacity in the 500-th cycle/the discharging capacity in the first cycle×100(%)) was calculated. The retention of the discharging capacity was used as the reference of the durability of the battery.

embodiment. On the other hand, the battery with relatively low capacity retention was manufactured by using the positive electrode according to Comparative example 1 in which one kind of lithium nickel cobalt manganese composite oxide was used as the positive electrode active material and the average primary particle diameter and the average secondary particle diameter both satisfy the range according to the present embodiment, the positive electrode according to Comparative example 2 in which one kind of lithium nickel cobalt manganese composite oxide was used as the positive electrode active material and the value of the average primary particle diameter does not satisfy the range according to the present embodiment, and the positive electrode according to Comparative example 3 in which the lithium nickel cobalt manganese composite oxide mixture containing two kinds of lithium nickel cobalt manganese composite oxides was used as the positive electrode active material and the value of the average secondary particle diameter does not satisfy the range according to the present embodiment. These results indicate that the lithium ion secondary battery with the high durability can be obtained by using the positive electrode including the positive electrode active material including the lithium nickel cobalt manganese composite oxide mixture containing at least two kinds of lithium nickel cobalt manganese composite oxides, and having the average primary particle diameter and the average secondary particle diameter both satisfying the range according to the present embodiment.

Examples according to the present disclosure have been described so far. However, the above description merely represents some examples of the embodiment of the present disclosure. Examples described above are not intended to

TABLE 1

|  | Positive electrode active material | $d_{50}$ (μm) | $D_{50}$ (μm) | Positive electrode active material (% by weight) | CB (% by weight) | GR (% by weight) | PVDF (% by weight) | Capacity retention (%) |
| --- | --- | --- | --- | --- | --- | --- | --- | --- |
| Comparative example 1 | NCM622 | 1.2 | 11.8 | 95 | 2 | 0 | 3 | 61 |
| Comparative example 2 | NCM523 | 2.7 | 9.3 | 93 | 3 | 1 | 3 | 65 |
| Comparative example 3 | NCM523 NCM622 | 1.9 | 13.3 | 55.8 37.2 | 3 | 0 | 4 | 62 |
| Example 1 | NCM433 NCM[4.5]2[3.5] NCM523 | 0.6 | 8.7 | 27.9 27.9 37.2 | 3 | 0 | 4 | 87 |
| Example 2 | NCM424 NCM[5.5]2[2.5] | 0.5 | 11.8 | 37.2 55.8 | 2 | 2 | 3 | 90 |
| Example 3 | NCM[3.5]3[3.5] NCM[4.5][2.5]3 | 0.7 | 6.3 | 28.2 65.8 | 2 | 1 | 3 | 91 |

The battery with the high capacity retention was manufactured by using the positive electrode according to Examples 2 and 3 in which the lithium nickel cobalt manganese composite oxide mixture containing two kinds of lithium nickel cobalt manganese composite oxides was used as the positive electrode active material and the average primary particle diameter and the average secondary particle diameter both satisfy the range according to the present embodiment. In addition, the battery with the high capacity retention was manufactured by using the positive electrode according to Example 1 in which the lithium nickel cobalt manganese composite oxide mixture containing three kinds of lithium nickel cobalt manganese composite oxides was used as the positive electrode active material and the average primary particle diameter and the average secondary particle diameter both satisfy the range according to the present limit the technical range of the present embodiment to the particular embodiment or the specific structure.

The positive electrode for a lithium ion secondary battery according to the present disclosure may be any of the following first to fourth positive electrodes for a lithium ion secondary battery.

The first positive electrode for a lithium ion secondary battery is a positive electrode for a lithium ion secondary battery that includes a positive electrode active material layer including a positive electrode active material provided to at least one surface of a positive electrode current collector. The positive electrode active material includes a lithium nickel cobalt manganese composite oxide mixture containing two or more kinds of lithium nickel cobalt manganese composite oxides; an average primary particle diameter ($d_{50}$) of the lithium nickel cobalt manganese composite oxide mixture is in a range of 0.4 micrometers or more and 2 micrometers or less; an average secondary particle diameter ($D_{50}$) of the lithium nickel cobalt manganese composite oxide mixture is in a range of 4 micrometers or more and 12 micrometers or less; and the positive electrode active material layer includes a conductive agent in a range of 1 to 5% based on a weight of the positive electrode active material layer.

The second positive electrode for a lithium ion secondary battery is the first positive electrode for a lithium ion secondary battery. The positive electrode active material layer further includes binder in a range of 1 to 5% based on the weight of the positive electrode active material layer.

The third positive electrode for a lithium ion secondary battery is a positive electrode for a lithium ion secondary battery that includes a positive electrode active material layer including a positive electrode active material provided to at least one surface of a positive electrode current collector. The positive electrode active material includes a lithium nickel cobalt manganese composite oxide mixture containing three or more kinds of lithium nickel cobalt manganese composite oxides; an average primary particle diameter ($d_{50}$) of the lithium nickel cobalt manganese composite oxide mixture is in a range of 0.2 micrometers or more and 2.5 micrometers or less; an average secondary particle diameter ($D_{50}$) of the lithium nickel cobalt manganese composite oxide mixture is in a range of 3 micrometers or more and 12 micrometers or less; and the positive electrode active material layer includes a conductive agent in a range of 1 to 5% based on a weight of the positive electrode active material layer.

The fourth positive electrode for a lithium ion secondary battery is the third positive electrode for a lithium ion secondary battery in which the positive electrode active material layer further includes binder in a range of 1 to 5% based on the weight of the positive electrode active material layer.

The lithium ion secondary battery according to the present disclosure may include a power generating element inside a package, the power generating element including any of the first to fourth positive electrodes for a lithium ion secondary battery, a negative electrode for a lithium ion secondary battery including a negative electrode active material layer including a negative electrode active material provided to at least one surface of a negative electrode current collector, a separator, and an electrolyte solution.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode for a lithium ion secondary battery, comprising a positive electrode active material layer including a positive electrode active material that is provided to at least one surface of a positive electrode current collector, wherein: the positive electrode active material consists of a lithium nickel cobalt manganese composite oxide mixture comprising (1), (2) or (3);
   (1) $LiNi_{0.4} Co_{0.3} Mn_{0.3} O_2$ (NCM433), $LiNi_{0.45} Co_{0.2} Mn_{0.35} O_2$ (NCM[4.5]2[3.5]) and $LiNi_{0.5}Co_{0.2}Mn_{0.3}O_2$ (NCM523),
   (2) $LiNi_{0.4} Co_{0.2} Mn_{0.4} O_2$ (NCM424) and $LiNi_{0.55} Co_{0.2} Mn_{0.25} O_2$ (NCM[5.5]2[2.5]), and
   (3) $LiNi_{0.35} Co_{0.3} Mn_{0.35} O_2$ (NCM[3.5]3[3.5]) and $LiNi_{0.45} Co_{0.25} Mn_{0.3} O_2$ (NCM[4.5][2.5]3);
   an average primary particle diameter of the lithium nickel cobalt manganese composite oxide mixture is in a range of 0.5 micrometers or more and 0.7 micrometers or less; an average secondary particle diameter of the lithium nickel cobalt manganese composite oxide mixture is in a range of 6.3 micrometers or more and 11.8 micrometers or less; and the positive electrode active material layer includes a conductive agent in a range of 1 to 5% based on a weight of the positive electrode active material layer,
   wherein the positive electrode active material layer further includes binder in a range of 1 to 5% based on the weight of the positive electrode active material layer.

2. A lithium ion secondary battery comprising a power generating element and a package, wherein:
   the package includes the power generating element internally; and
   the power generating element includes the positive electrode for a lithium ion secondary battery according to claim 1, a negative electrode for a lithium ion secondary battery including a negative electrode active material layer including a negative electrode active material that is provided to at least one surface of a negative electrode current collector, a separator, and an electrolyte solution.

3. A lithium ion secondary battery comprising a power generating element and a package, wherein: the package includes the power generating element internally; and the power generating element includes the positive electrode for a lithium ion secondary battery according to claim 1, a negative electrode for a lithium ion secondary battery including a negative electrode active material layer including a negative electrode active material that is provided to at least one surface of a negative electrode current collector, a separator, and an electrolyte solution.

4. The positive electrode for a lithium ion secondary battery according to claim 1, wherein said lithium nickel cobalt manganese composite oxide mixture comprises (1) $LiNi_{0.4} Co_{0.3} Mn_{0.3} O_2$ (NCM433), $LiNi_{0.45} Co_{0.2} Mn_{0.35} O_2$ (NCM[4.5]2[3.5]) and $LiNi_{0.5} Co_{0.2} Mn_{0.3} O_2$ ($NCM_{523}$).

5. The positive electrode for a lithium ion secondary battery according to claim 1, wherein said lithium nickel cobalt manganese composite oxide mixture comprises (3) $LiNi_{0.4} Co_{0.2} Mn_{0.4} O_2$ (NCM424) and $LiNi_{0.55} Co_{0.2} Mn_{0.25} O_2$ (NCM[5.5]2[2.5]).

6. The positive electrode for a lithium ion secondary battery according to claim 1, wherein said lithium nickel cobalt manganese composite oxide mixture comprises (3) $LiNi_{0.35} Co_{0.3} Mn_{0.35} O_2$ (NCM[3.5]3[3.5]) and $LiNi_{0.45} Co_{0.25} Mn_{0.3} O_2$ (NCM[4.5][2.5]3).

* * * * *